United States Patent
Wu et al.

(10) Patent No.: US 7,018,049 B2
(45) Date of Patent: Mar. 28, 2006

(54) PROJECTION COOLING APPARATUS

(75) Inventors: Shang-Hsuang Wu, Hsinchu (TW);
Nien-Hui Hsu, Hsinchu (TW);
Ching-Chung Nien, Hsinchu (TW)

(73) Assignee: Coretronic Corporation, Hsinchu (TW)

(*) Notice: Subject to any disclaimer, the term of this patent is extended or adjusted under 35 U.S.C. 154(b) by 9 days.

(21) Appl. No.: 10/657,158

(22) Filed: Sep. 9, 2003

(65) Prior Publication Data

US 2004/0189953 A1    Sep. 30, 2004

(30) Foreign Application Priority Data

Dec. 19, 2002  (TW) .............................. 91221019 U

(51) Int. Cl.
G03B 21/16  (2006.01)
G03B 21/18  (2006.01)

(52) U.S. Cl. .......................................... 353/58; 353/60
(58) Field of Classification Search ................ 353/52, 353/57–58, 60
See application file for complete search history.

(56) References Cited

U.S. PATENT DOCUMENTS

| | | | | |
|---|---|---|---|---|
| 6,364,492 B1* | 4/2002 | Fujimori et al. | ............... | 353/57 |
| 6,402,324 B1* | 6/2002 | Kuroda et al. | ............... | 353/52 |
| 6,419,364 B1* | 7/2002 | Takizawa et al. | ............ | 353/52 |
| 6,637,895 B1* | 10/2003 | Fujimori et al. | ............... | 353/57 |

* cited by examiner

*Primary Examiner*—Christopher Mahoney
(74) *Attorney, Agent, or Firm*—Bacon & Thomas, PLLC

(57) ABSTRACT

A projection cooling apparatus comprises a first cooling path and a second cooling path. The first cooling path includes a temperature sensor and an exhaust fan respectively installed in an inlet and an outlet of the first cooling path. The second cooling path includes a temperature sensor, a power supply unit, and a guiding fan. According to the detecting temperature resulted from the change of power supply and the environmental temperature, the temperature sensors of the first and second cooling path control the rotational speed of two sets of the fans to reach the best cooling effect, reduce the noises and extend the lifetime of the fan.

4 Claims, 3 Drawing Sheets

PROJECTION COOLING APPARATUS

BACKGROUND OF THE INVENTION

1. Field of the Invention

The present invention relates to a cooling apparatus, and more particularly to a cooling apparatus for use in the projection display apparatus.

2. Description of the Related Art

For the high quality images and the convenience of the projection display apparatus, the projection display apparatus is more and more popular in various fields of the whole world. Generally, the 75% heat of the projection display apparatus is from the light lamp and the other 25% is from the power supply unit.

A projection display apparatus 10 of the prior art mainly includes a light lamp 11, an optical engine 12, a power supply unit 13, and a cooling apparatus 14. The cooling apparatus 14 is by means of a fan 141 and a plurality of guiding plate 142A, 142B, and 143C to sequentially guide the cooling airflows provided by the fan 141 to the light lamp 11, the optical engine 12, and the power supply unit 13. The light lamp 11 is far from the fan 141 so the cooling path is too long that causes the cooling energy loss. The optical engine 12 and the power supply unit 13 adjacent to the fan 141 have limited cooling efficiency for the bad design of the guiding plate 142A and 142C. In addition, depending on different standard alternating current which the various countries have, the power devices (such as the resistances, capacitance, diodes, and coils) inside the power supply unit 13 have different power, and produce the more or less heat to cause the devices inside the projection display apparatus to have different temperature so that the projection display apparatus of the prior art, by means of a single cooling apparatus 14, can't reach the best cooling efficiency.

Meanwhile, the projection cooling apparatus of the prior art can't adjust to the input voltage to instantaneously adjust the rotational speed of the fan. Therefore, the prior art apparatus not only can't instantaneously cool the power supply unit 13 but also can't adjust the rotational speed of the fan according to the different standard alternating current or the different environmental temperature to reach the best cooling efficiency.

SUMMARY OF THE INVENTION

An object of the present invention is to provide a projection cooling apparatus, which detects the temperature of different positions in a projection display to individually control the cooling apparatus and instantaneously raise the cooling efficiency.

Another object of the present invention is to provide a projection cooling apparatus, which adjusts the rotational speeds of the fans to provide the heating devices with suitable airflows and prevent the fans from operating at high rotational speed for long term so as to extend the lifetime of the fans and prevent noises.

To achieve the above and other objects, the present invention includes a projection cooling apparatus comprises a first cooling path and a second cooling path. The first cooling path includes a temperature sensor and an exhaust fan respectively installed in an inlet and an outlet of the first cooling path. The second cooling path includes a temperature sensor, a power supply unit, and a guiding fan. According to the detecting temperature resulted from the change of power supply and the environmental temperature, the temperature sensors of the first and second cooling path control the rotational speed of two sets of the fans to reach the best cooling effect, reduce the noises and extend the lifetime of the fan.

BRIEF DESCRIPTION OF THE DRAWINGS

The above and other objects, advantages, and features of the present invention will be understood from the following detailed description of the invention when considered in connection with the accompanying drawings below.

DETAILED DESCRIPTION OF THE INVENTION

Figure 1:
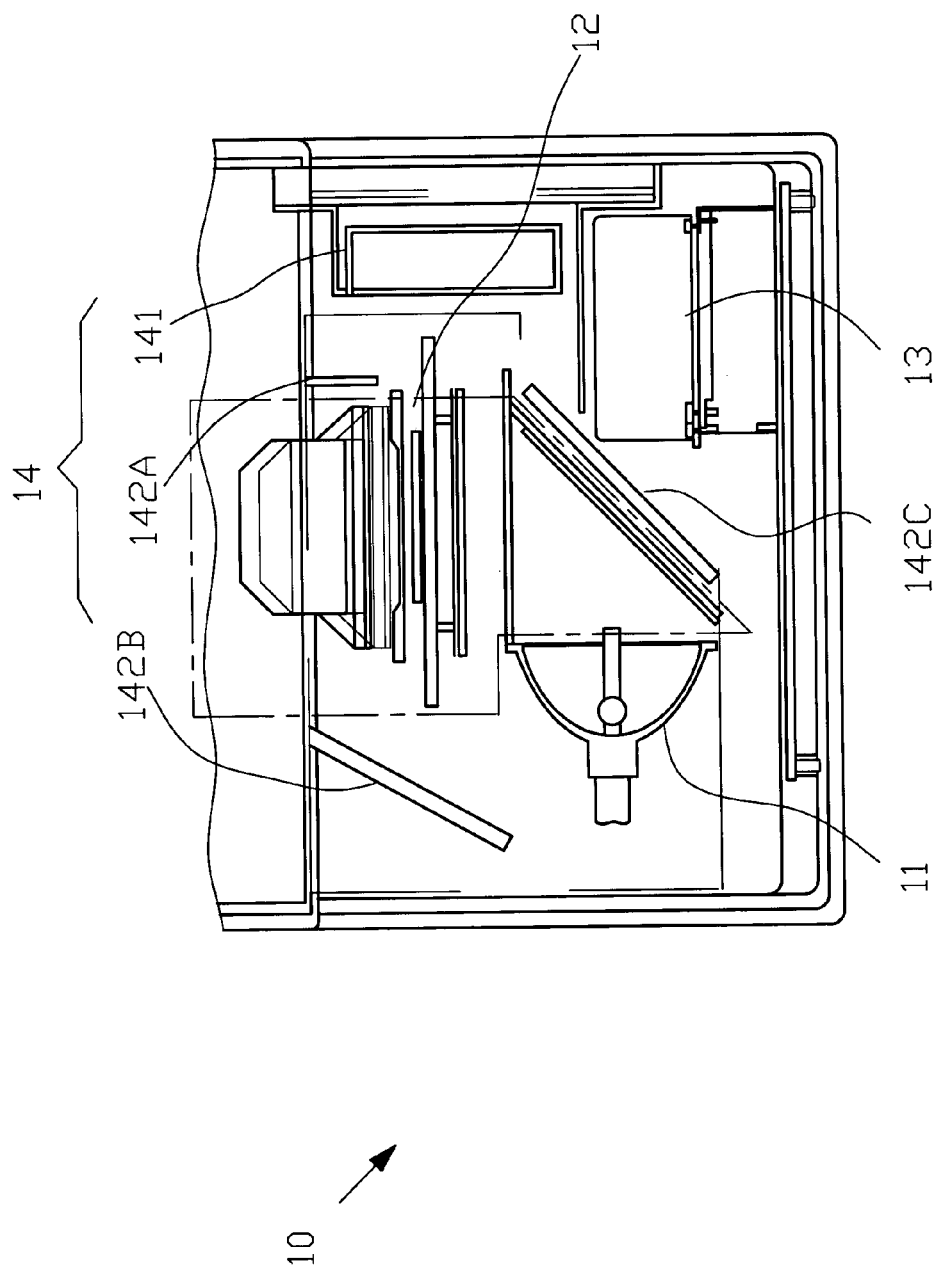
FIG. 1 is a schematic view showing a projection cooling apparatus of the prior art.
Figure 2:
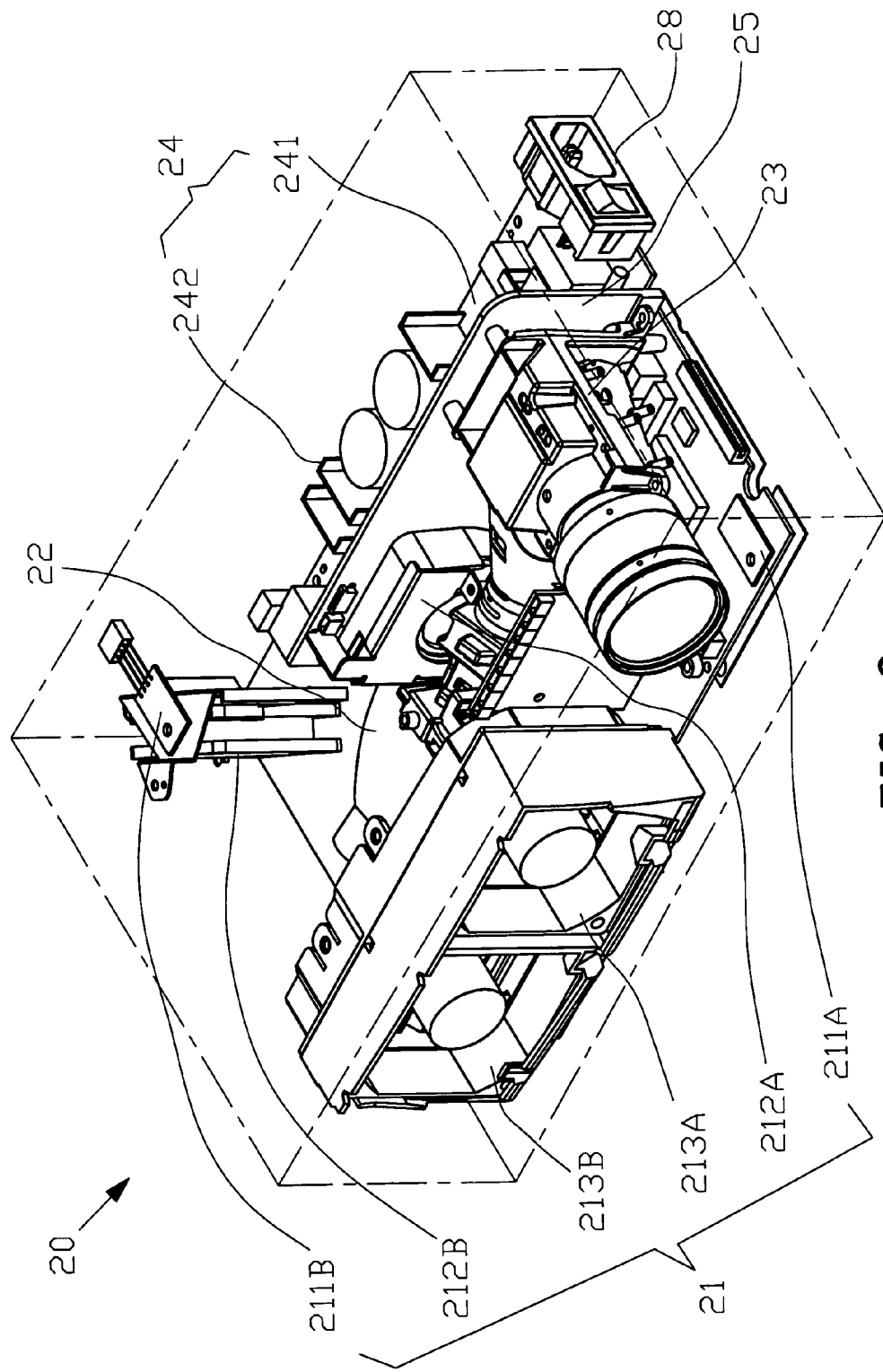
FIG. 2 is a perspective view showing a projection cooling apparatus of the present invention.

Referring to FIG. 2, a projection display apparatus 20 of the present invention includes a cooling apparatus 21, a light lamp 22, an optical engine 23, and a power supply unit 24 which has a low voltage power supply 241 and a ballast power supply 242, wherein the optical engine 23 and the power supply unit 24 are separated by a partition 25.

Figure 3:
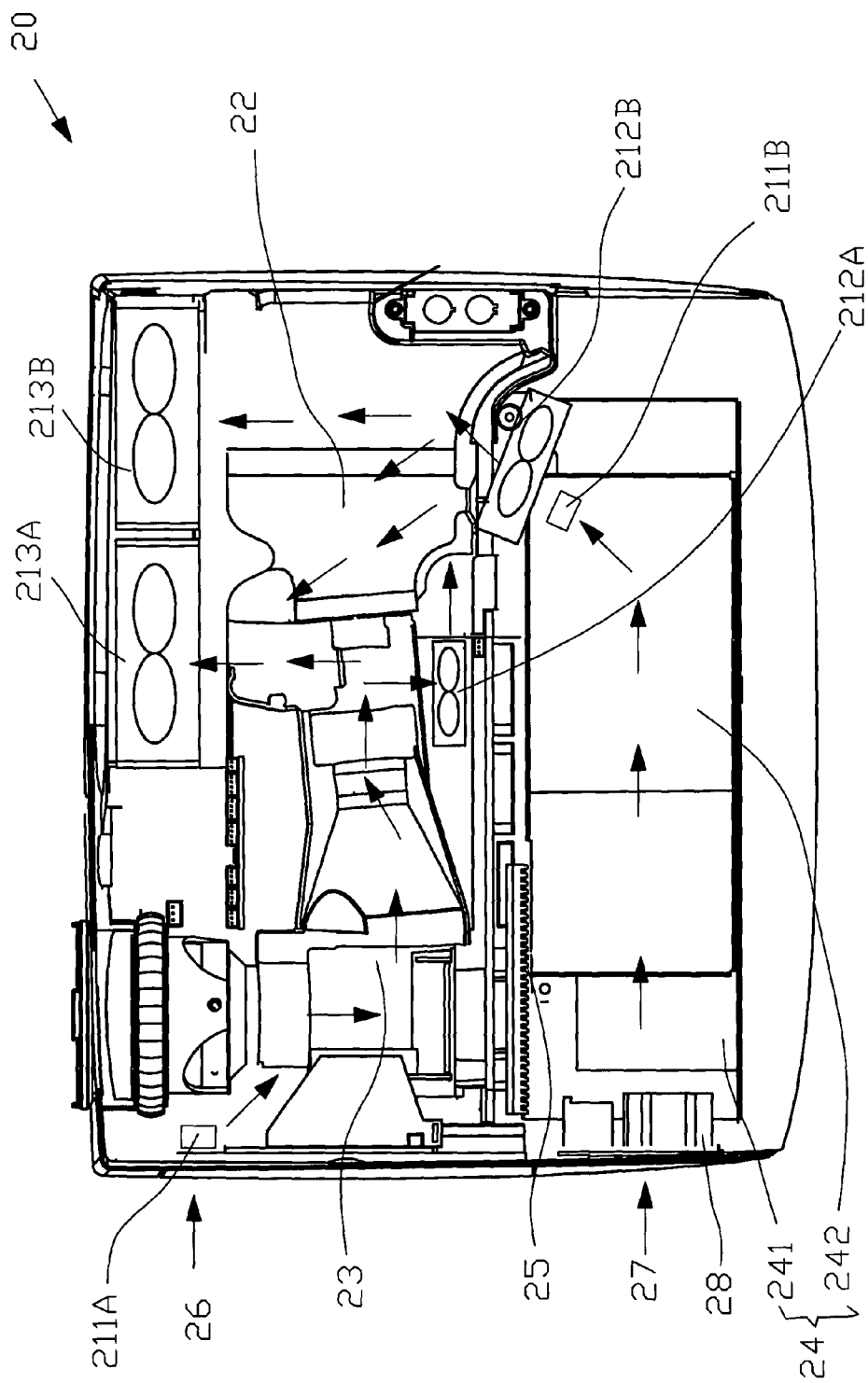
FIG. 3 is a schematic view showing a projection cooling apparatus of the present invention.

Referring to FIG. 3, the cooling apparatus 21 mainly comprises two temperature sensors 211A and 211B, two guiding fans 212A and 212B, and two exhaust fans 213A and 213B. The first temperature sensor 211A is placed adjacent to the air inlet of the optical engine to detect the temperature of air entering the projection display apparatus 20. After guiding the air travels through the optical engine 23, part of the air is drawn by the first guiding fan 212A through the backside of the light lamp 22 and exhausted by the first exhausted fan 213A out of the projection display apparatus 20, thus, to form a first cooling path 26. In addition, adjacent the inlet of one side of the power supply unit 24, the guiding air in sequence passes travel the low voltage power supply 241 and the ballast power supply 242 of the power supply unit 24, and, then, is drawn by the second guiding fan 212B which is on the other side of the power supply 24 to pass through the inside and front side of the light lamp 22, and, finally, exhausts by the second exhaust fan 212B out of the projection display apparatus 20. Furthermore, a second temperature sensor 211B is placed between the second guiding fan 212B and the power supply unit 24 to form a second cooling path 27.

To fully cool the optical engine 23 and the light lamp 22, the first temperature sensor 211A of the cooling apparatus 21 of the present invention is on the inlet of the first cooling path 26 to detect the environmental temperature at the inlet. Based on the environmental temperature, the cooling apparatus 21 instantaneously adjusts the rotational speeds of the guiding fan 212A, the exhaust fan 213A, and the exhaust fan 213B to provide the whole projection display apparatus 20, i.e. the first cooling path 26 and second cooling path 27, with adequate cooling air. Then, depending on the surrounding temperature change, the cooling apparatus 21 can properly raise or lower the rotational speeds of the fans to prevent the fans from rotating at the overly high speed, reducing the lifetime and making noises, or to prevent the fans from rotating at the overly low speed, causing the bad cooling efficiency of the projection display apparatus and affecting the efficiency of the optical devices which lowers the quality of the projection images. Furthermore, placing the first temperature sensor 211A on the inlet can prevent the temperature sensor 211A from being affected by the temperature change of the projection display apparatus. In addition, as the voltage input 28 inputs different voltage, which causes the temperature of the low voltage power supply 241 and the ballast power supply 242 to rise or lower, the second temperature sensor 211B can detect the temperature alone, and the cooling apparatus 21 instantaneously adjusts the rotational speed of the second guiding fan 212B to properly cool the low voltage power supply 241 and the ballast power supply 242 and not to affect the rotational speeds of the other fans. Therefore, this can prevent the other fans from rotating at such lower speed that the projection display apparatus is subjected to bad cooling efficiency and the quality of the projection images is lowered, or prevent the fans from rotating at higher speed to reduce the noises of the fans and increase the lifetime of the projection display apparatus.

It will be apparent to those skilled in the art that in light of the forgoing disclosure, many alternations and modifications are possible in the practice of this invention without departing from the spirit or scoop thereof. Accordingly, the scoop of the invention is to be considered in accordance with the substance defined in the following claims.

What is claimed is:

1. A projection cooling apparatus, comprising:
   a first cooling path having a temperature sensor on an inlet and an exhaust fan on an outlet;
   an optical engine which is on the first cooling path;
   a second cooling path having a guiding fan and a temperature sensor; and
   a power supply unit which is on said second cooling path,
   wherein said temperature sensor of said second cooling path is placed between said guiding fan and said power supply unit.

2. The projection cooling apparatus according to claim 1, wherein said first cooling path further comprises a light lamp and a guiding fan which draws air to cool said light lamp.

3. The projection cooling apparatus according to claim 1, wherein said power supply unit comprises a low voltage power supply and a ballast power supply.

4. The projection cooling apparatus according to claim 1, wherein the cooling apparatus controls and adjusts the rotational speed of said guiding fan on said second cooling path according to the temperature detected by said temperature sensor on said second cooling path.

* * * * *